June 19, 1923.
M. DAJKA
COMPRESSED AIR ENGINE CONTROL DEVICE
Filed April 18, 1922
1,459,575
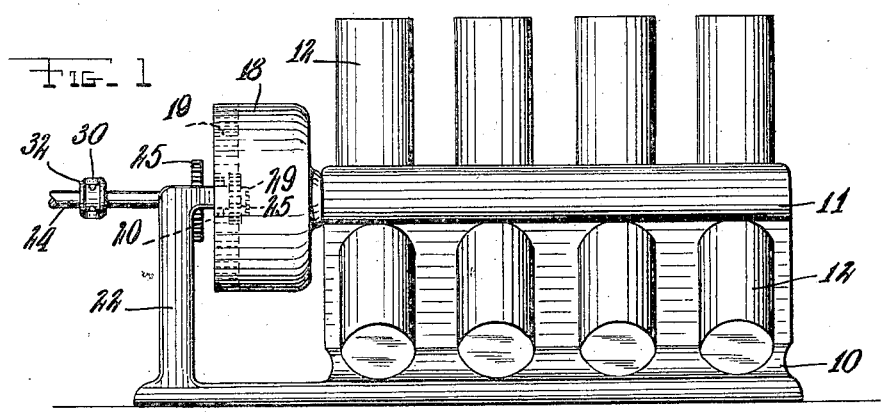
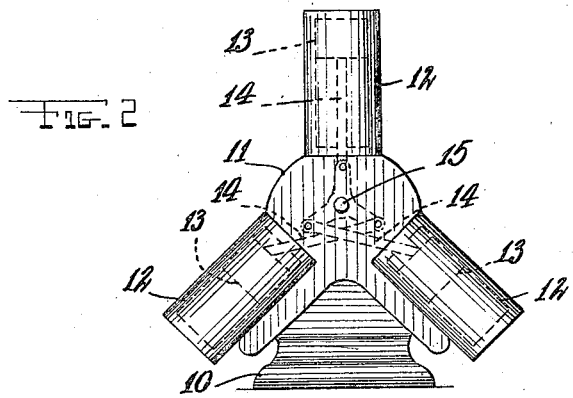
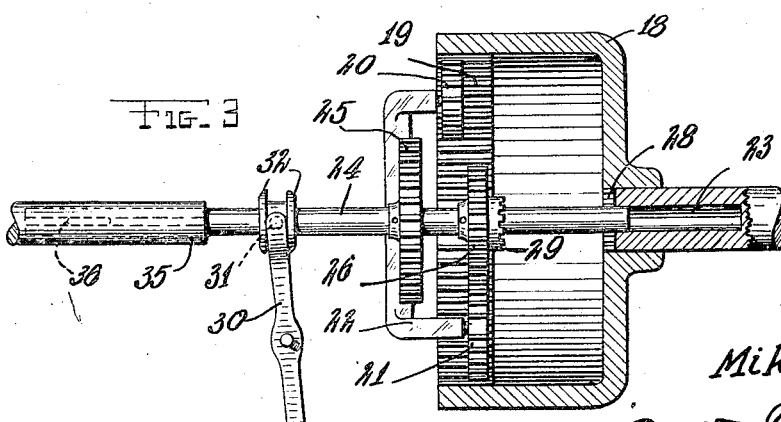
Inventor
Mike Dajka Patented June 19, 1923.

1,459,575

UNITED STATES PATENT OFFICE.

MIKE DAJKA, OF TORRINGTON, CONNECTICUT.

COMPRESSED-AIR-ENGINE CONTROL DEVICE.

Application filed April 18, 1922. Serial No. 555,161.

*To all whom it may concern:*

Be it known that I, MIKE DAJKA, a citizen of Hungary, residing at Torrington, in the county of Litchfield and State of Connecticut, have invented certain new and useful Improvements in Compressed-Air-Engine Control Devices, of which the following is a specification.

This invention relates to engines, being adapted for embodiment in air engines, or others, having for an object the provision of a novel form of engine and variable speed means for applying the power of the engine to a desired mechanism.

For further comprehension of the invention, and of the objects and advantages thereof, reference will be had to the following description and accompanying drawings, and to the appended claims in which the various novel features of the invention are more particularly set forth.

Fig. 1 of the drawings is a side elevation of an engine constructed according to my invention.

Fig. 2 is an end view thereof.

Fig. 3 is an enlarged detail horizontal sectional view of the transmission mechanism.

As here embodied my improved engine comprises a base 10 on which is a crank case 11. My improved engine is of multi-cylinder construction the cylinders being indicated at 12 and being arranged in sets of three spaced equally around the crank case 11, and having pistons 13 therein connected to the crank shaft 15 by piston rods 14.

Mounted on one end of the crank shaft 15 is a fly-wheel 18 which is of hollow construction and forms part of the variable speed transmission means. This fly-wheel is of cup-like form with one end open and it is formed adjacent the open end with a wide-faced internal gear 19.

Meshing with this internal gear 19, are a pair of gears, 20 and 21 respectively, of different sizes which are located one on each side of the shaft axis and offset from one another longitudinally of the latter. These gears may be suitably mounted on bracket elements 22 projected from the engine base 10. The end of the crank shaft 15 is flush with the radial flange of the fly-wheel 18 and is formed with an axial boring 23 to freely support a driven shaft 24 engaging therein. Upon this driven shaft 24 are a pair of gears 25 and 26 respectively of such differing diameters as to mesh with the respective gears 20 and 21 when brought into registry therewith, these gears 25 and 26 having a different relative longitudinal spacing than the gears 20, 21 so as to mesh one at a time each with its respective gear.

Formed on the end of the crank shaft 15 is a clutch face 28 which is adapted to be engaged by a clutch element 29 on the gear 26. The shaft 24 is adapted to be moved longitudinally by means of a hand lever 30 having a stud 31 engaging between two collars 32 fixed on said shaft. The lever 30 may be locked in adjusted positions by any suitable means not necessary here to be shown.

As will be apparent, when shaft 24 is shifted to the extreme right, considering the parts as shown in Fig. 3, the clutch elements 28 and 29 will be engaged with each other and shaft 24 will be driven direct from the crank shaft 15 at equal speed therewith. If shaft 24 be shifted to the left slightly from the above position the larger gear 25 thereon will engage the smaller idler gear 20, and in consequence the shaft 24 will be driven at an increased rate of speed; while if shaft 24 be moved to the extreme left, which is the position shown in Fig. 3, the smaller gear 26 thereon meshes with the larger idler gear 21 and the shaft 24 is driven at a still higher rate of speed. Shaft 24 may transmit its motion to an alined hollow shaft 35 with which it has a feather connection as indicated at 36.

While I have shown and described a preferred embodiment of my invention it is to be understood that I do not limit myself to the precise construction here shown, and that various changes and modifications might be made therein without departing from the spirit and scope of the invention as defined in the appended claims.

Having thus described my invention what I claim as new and desire to protect by Letters Patent of the United States is as follows:

1. In an engine, a drive shaft, a fly-wheel thereon formed with an internal gear, a driven shaft alined with said drive shaft, and variable speed connections between said drive and driven shafts comprising idler gears engaging said internal gear, and gears on said driven shaft adapted to selectively engage said idler gears.

2. In an engine, a drive shaft, a fly-wheel thereon formed with an internal gear, a driven shaft alined with said drive shaft, and variable speed connections between said drive and driven shafts comprising idler gears engaging said internal gear, and gears on said driven shaft adapted to selectively engage said idler gears, said last mentioned gears being fixed on said driven shaft, and said driven shaft being adapted for longitudinal movement to bring the gears thereon into engagement with said idler gears.

3. In an engine, a drive shaft, a cup-like fly-wheel thereon, an internal gear in said fly-wheel, a pair of idler gears of relatively differing diameters engaged with said internal gear, a driven shaft alined with said drive shaft, and a pair of gears of different sizes on said driven shaft adapted to selectively engage said idler gears.

4. In an engine, a drive shaft, a cup-like fly-wheel thereon, an internal gear in said fly-wheel, a pair of idler gears of relatively differing diameters engaged with said internal gear, a driven shaft alined with said drive shaft, and a pair of gears of different sizes on said driven shaft adapted to selectively engage said idler gears, and means for shifting said gears in unison axially of said drive shaft.

5. In an engine, a drive shaft, a cup-like fly-wheel thereon, an internal gear in said fly-wheel, a pair of idler gears of relatively differing diameters engaged with said internal gear, a driven shaft alined with said drive shaft, and a pair of gears of different sizes on said driven shaft adapted to selectively engage said idler gears, said driven gears being fixed to said driven shaft, and means for shifting said driven shaft axially to engage the gears thereon individually with the said idler gears.

6. In an engine, a drive shaft, a cup-like fly-wheel thereon, an internal gear in said fly-wheel, a pair of idler gears of relatively differing diameters engaged with said internal gear, a driven shaft alined with said drive shaft, and a pair of gears of different sizes on said driven shaft adapted to selectively engage said idler gears, said driven gears being fixed to said driven shaft, and means for shifting said driven shaft axially to engage the gears thereon individually with the said idler gears, and clutch elements formed on said drive and driven shafts, for the purpose specified.

In testimony whereof I have affixed my signature.

MIKE DAJKA.